US008625894B2

United States Patent
Choe et al.

(10) Patent No.: US 8,625,894 B2
(45) Date of Patent: Jan. 7, 2014

(54) IMAGE DISPLAY DEVICE CAPABLE OF SUPPORTING BRIGHTNESS ENHANCEMENT AND POWER CONTROL AND METHOD THEREOF

(75) Inventors: Won-hee Choe, Gyeongju-si (KR); In-ji Kim, Yongin-si (KR); Seong-deok Lee, Suwon-si (KR); Chang-yeong Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/418,116

(22) Filed: Mar. 12, 2012

(65) Prior Publication Data

US 2012/0169797 A1    Jul. 5, 2012

Related U.S. Application Data

(62) Division of application No. 11/492,117, filed on Jul. 25, 2006, now abandoned.

(30) Foreign Application Priority Data

Aug. 26, 2005  (KR) .................. 10-2005-0078861

(51) Int. Cl.
*G06K 9/00* (2006.01)
(52) U.S. Cl.
USPC ............ 382/169; 345/102; 345/589; 345/690
(58) Field of Classification Search
USPC .......................................... 345/102, 589, 690
See application file for complete search history.

(56) References Cited

U.S. PATENT DOCUMENTS

| 4,831,434 A | | 5/1989 | Fuchsberger |
| 4,975,970 A | * | 12/1990 | Zettel et al. .................. 382/131 |
| 6,414,664 B1 | | 7/2002 | Conover et al. |
| 6,795,053 B1 | | 9/2004 | Funamoto et al. |
| 2003/0122845 A1 | | 7/2003 | Lee et al. |

(Continued)

FOREIGN PATENT DOCUMENTS

| JP | 7-322179 | 12/1995 |
| KR | 2004-019529 | 3/2004 |

(Continued)

OTHER PUBLICATIONS

Chang et al, DLS: Dyhamic Backlight Luminance Scaling of Liquid Crystal Display, IEEE 2004.*

(Continued)

*Primary Examiner* — Chan S Park
*Assistant Examiner* — Mark Roz
(74) *Attorney, Agent, or Firm* — Staas & Halsey LLP

(57) ABSTRACT

An image display device capable of supporting brightness enhancement and power control and a method thereof, in which the brightness and contrast are enhanced and the power of a light source is controlled in accordance with the image characteristic. In the image display method, a parameter representative of an input image is calculated from a histogram of the input image, a model corresponding to the input image is selected from a plurality of representative models by analyzing the parameter, and then a brightness controlling function matched with the selected model is selected. The size of each component of a pixel constituting the input image is controlled using the brightness controlling function, and the output image of the pixel whose component size has been controlled is displayed.

8 Claims, 10 Drawing Sheets

(56) References Cited

U.S. PATENT DOCUMENTS

| | | | |
|---|---|---|---|
| 2003/0128298 | A1 | 7/2003 | Moon et al. |
| 2004/0201561 | A1 | 10/2004 | Funamoto et al. |
| 2005/0110740 | A1* | 5/2005 | Linzmeier et al. ............ 345/102 |
| 2005/0140640 | A1 | 6/2005 | Oh et al. |

FOREIGN PATENT DOCUMENTS

| | | |
|---|---|---|
| KR | 2004-026181 | 3/2004 |
| KR | 2004-48790 | 6/2004 |
| KR | 2005-8391 | 1/2005 |

OTHER PUBLICATIONS

Notice of Allowance dated Jul. 6, 2007 for corresponding Korean Patent Application No. 10-2007-0010279 (4 pages).
Notice of Allowance dated Jul. 6, 2007 for corresponding Korean Patent Application No. 10-2005-0078861 (4 pages).
Office Action for U.S. Appl. No. 11/492,117; mailed Oct. 16, 2009.
Office Action for U.S. Appl. No. 11/492,117; mailed Mar. 24, 2010.
Office Action for U.S. Appl. No. 11/492,117; mailed Jul. 27, 2010.
Office Action for U.S. Appl. No. 11/492,117; mailed Dec. 2, 2010.
Office Action for U.S. Appl. No. 11/492,117; mailed Jul. 19, 2011.
Office Action for U.S. Appl. No. 11/492,117; mailed Nov. 2, 2011.
G. Sharma, "LCDs Versus CRTs—Color-Calibration and Gamut Consideration", Proc. of IEEE, vol. 90, No. 4, Apr. 2002; pp. 605-622.
U.S. Appl. No. 11/491,242, filed Jul. 24, 2006, Won-hee Choe, et al., Samsung Electronics Co., Ltd.
U.S. Appl. No. 11/492,117, filed Jul. 25, 2006, Won-hee Choe, et al., Samsung Electronics Co., Ltd.

* cited by examiner

FIG. 9
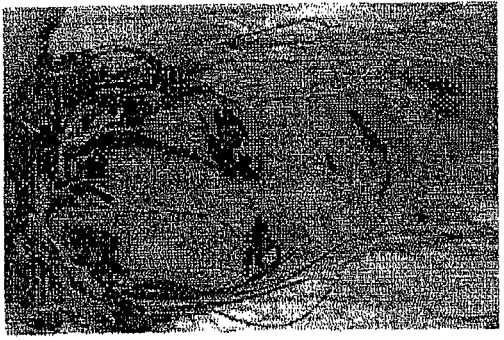
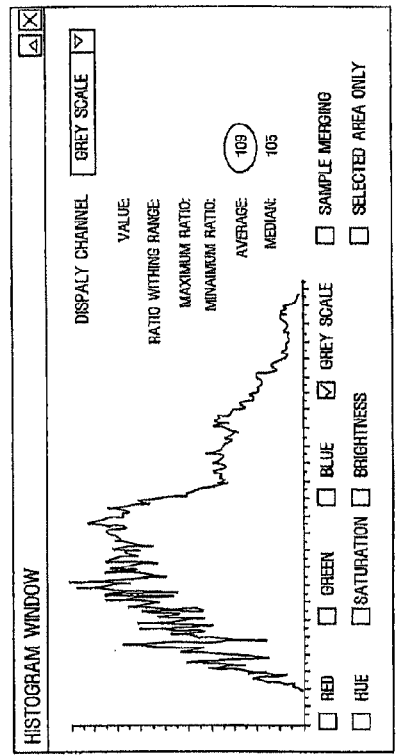
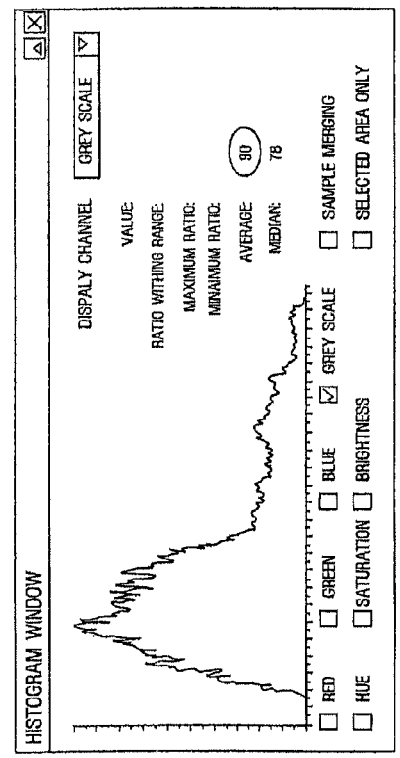

IMAGE DISPLAY DEVICE CAPABLE OF SUPPORTING BRIGHTNESS ENHANCEMENT AND POWER CONTROL AND METHOD THEREOF

CROSS-REFERENCE TO RELATED APPLICATIONS

This application is a U.S. divisional application of U.S. Ser. No. 11/492,117 filed in the United States Patent and Trademark Office on Jul. 25, 2006, now abandoned which claims earlier priority benefit to Korean Patent Application No. 10-2005-0078861 filed with the Korean Intellectual Property Office on Aug. 26, 2005, the disclosures of both of which are incorporated herein in their entirety by reference.

BACKGROUND OF THE INVENTION

1. Field of the Invention

The present invention relates to an image display device, and more particularly to an image display device capable of supporting brightness enhancement and power control and a method thereof, which can enhance the brightness and contrast of an image and control the power of a light source in accordance with the image characteristic.

2. Description of the Related Art

Information that is provided to a user through an image display device includes various kinds of multimedia contents as well as simple text information. Examples of the multimedia contents include still images, moving images, sound, and others. Among these multimedia contents, moving images are widely used in video on demand (VOD) services or interactive services. As such, researches on the standards for moving images are being actively carried out.

With the developments in the digital electronic engineering and technology, it is now common for analog data to be digitalized. Accordingly, various digital image processing technologies have been developed to efficiently process large amounts of digital data. The digital image processing technologies have the following advantages.

Generally, unwanted noise which often occurs when analog signals are processed by analog image devices, causing eventual degradation in the processed analog signals, can be prevented in the digital image processing devices.

Further, since digital signals can be processed by a computer, it is possible to perform various kinds of image processing such as image data compression.

At present, most of the digital image display devices such as liquid crystal displays (LCD), plasma display panels (PDP), and organic light-emitting diodes (OLED) adopt an RGB color model.

The color model (or color space) is used to obtain the correlation between any one color and other colors. Different image processing systems use different color models for their respective different reasons. The RGB color model is composed of the three primary colors of red (R), green (G), and blue (B). Spectral components of these colors are added to one another to form additional colors.

The RGB model has a three-dimensional cube having three axes that represent red, green and blue, respectively. The origin of the axes is expressed by black, and the opposite end of the cube is expressed by white. For example, in a 24-bit color graphic system having 8 bits per color channel, red is expressed as (255,0,0).

The RGB model allows a simple design of a computer graphic system. However, the RGB model is not ideal for all applications. This is because the correlation between color components red, green and blue is considerably high. Image processing technologies such as a histogram equalization process images using only brightness. Thus, it is necessary to frequently convert the RGB images into brightness images. To convert the images from RGB colors into brightness level, a value obtained by multiplying each component by ⅓, i.e., an average value is used. Alternatively, Equation (1) may be used in accordance with the National Television Systems Committee (NTSC) Standard.

$$Y=0.288R+0.587G+0.114B \quad (1)$$

The technology field relating to techniques for enhancing the brightness and contrast of images in an image display device based on the above-mentioned RGB image information may be divided into the field based on minimum/maximum/average of luminance, the field for adopting user's setting based on reference images, and the field for analyzing the histogram of luminance.

As an example of the first field, U.S. Pat. No. 6,795,053 discloses a technology for controlling the display light source based on brightness and contrast enhancement. As an example of the second field, U.S. Pat. No. 6,414,664 discloses a technology for expressing contrast in accordance with user's setting and controlling the display driving voltage.

The present invention belongs to the field for analyzing the histogram of luminance, and is to enhance the brightness and contrast and reduce the power consumption of a light source by extracting the image characteristic through such analysis.

SUMMARY OF THE INVENTION

Accordingly, the present invention has been made to solve the above-mentioned problems occurring in the prior art, and an aspect of the present invention is to provide an image display device capable of supporting brightness enhancement and power control and a method thereof, in which the brightness and contrast are enhanced to be suitable for the image characteristic.

Another aspect of the present invention is to provide an image display device capable of supporting brightness enhancement and power control and a method thereof, in which the power of a light source is lowered in proportional to the enhanced brightness and contrast to reduce the power consumption of the image display device.

Additional advantages, aspects, and features of the invention will be set forth in part in the description which follows and in part will become apparent to those having ordinary skill in the art upon examination of the following or may be learned from practice of the invention.

In order to accomplish these aspects, there is provided a method of displaying an image, the method including calculating a parameter representative of an input image from a histogram of the input image, selecting a model corresponding to the input image from a plurality of representative models by analyzing the parameter, selecting a brightness controlling function matched with the selected model, controlling the size of each component of a pixel constituting the input image by using the brightness controlling function, and displaying an output image of the pixel whose component size has been controlled.

In another aspect of the present invention, there is provided a method of displaying an image, the method including controlling the size of each component of a pixel constituting an input image, calculating a brightness of the input image and a brightness of an output image of the pixel whose size is controlled, calculating a power decrease ratio that can offset a luminance difference between the brightness of the input image and the brightness of the output image, and displaying the output image based on a light source driven by a power decreased by the power decrease ratio.

In still another aspect of the present invention, there is provided a method of displaying an image, the method including receiving an input image, receiving a power decrease ratio from a user, calculating a brightness of an output image corresponding to the input image, which can offset a decrease ratio of luminance decreased depending on the power decrease ratio, controlling the size of each component of a pixel constituting the input image in accordance with the brightness of the output image, and displaying the output image of the pixel whose component size has been controlled, based on a light source that is driven by a power decreased by the power decrease ratio.

In still another aspect of the present invention, there is provided an image display device, which includes a histogram analyzer calculating a parameter representative of histogram from a gray scale pixel value of an input image, a model selector selecting a model corresponding to the input image from a plurality of representative models by analyzing the parameter, and selecting a brightness controlling function matched with the selected model, a pixel controller controlling the size of each component of a pixel constituting the input image using the brightness controlling function, and an image output unit displaying the output image of the pixel whose component size has been controlled.

In still another aspect of the present invention, there is provided an image display device, which includes a pixel controller controlling the size of each component of a pixel constituting an input image and calculating a brightness of the input image and a brightness of an output image of the pixel whose size is controlled, a power controller calculating a power decrease ratio that can offset a luminance difference between the brightness of the input image and the brightness of the output image, a light source unit driven by a power decreased by the power decrease ratio, and an image output unit displaying the output image based on a light source provided from the light source unit.

In still another aspect of the present invention, there is provided an image display device, which includes an image input unit receiving an input image, a power controller receiving a power decrease ratio from a user and calculating a brightness of an output image for the input image, which can offset a luminance decrease ratio decreased depending on the power decrease ratio, a pixel controller controlling the size of each component of a pixel constituting the input image in accordance with the brightness of the output image, a light source unit driven by a power decreased by the power decrease ratio, and an image output unit displaying the output image of the pixel whose component size is controlled, based on a light source from the light source unit.

BRIEF DESCRIPTION OF THE DRAWINGS

The above and other aspects, features and advantages of the present invention will be more apparent from the following detailed description taken in conjunction with the accompanying drawings, in which:

FIG. 9 illustrates experimental results of an input image whose brightness is increased by the image display device of FIG. 1;

DETAILED DESCRIPTION OF THE PREFERRED EMBODIMENTS

Figure 1:
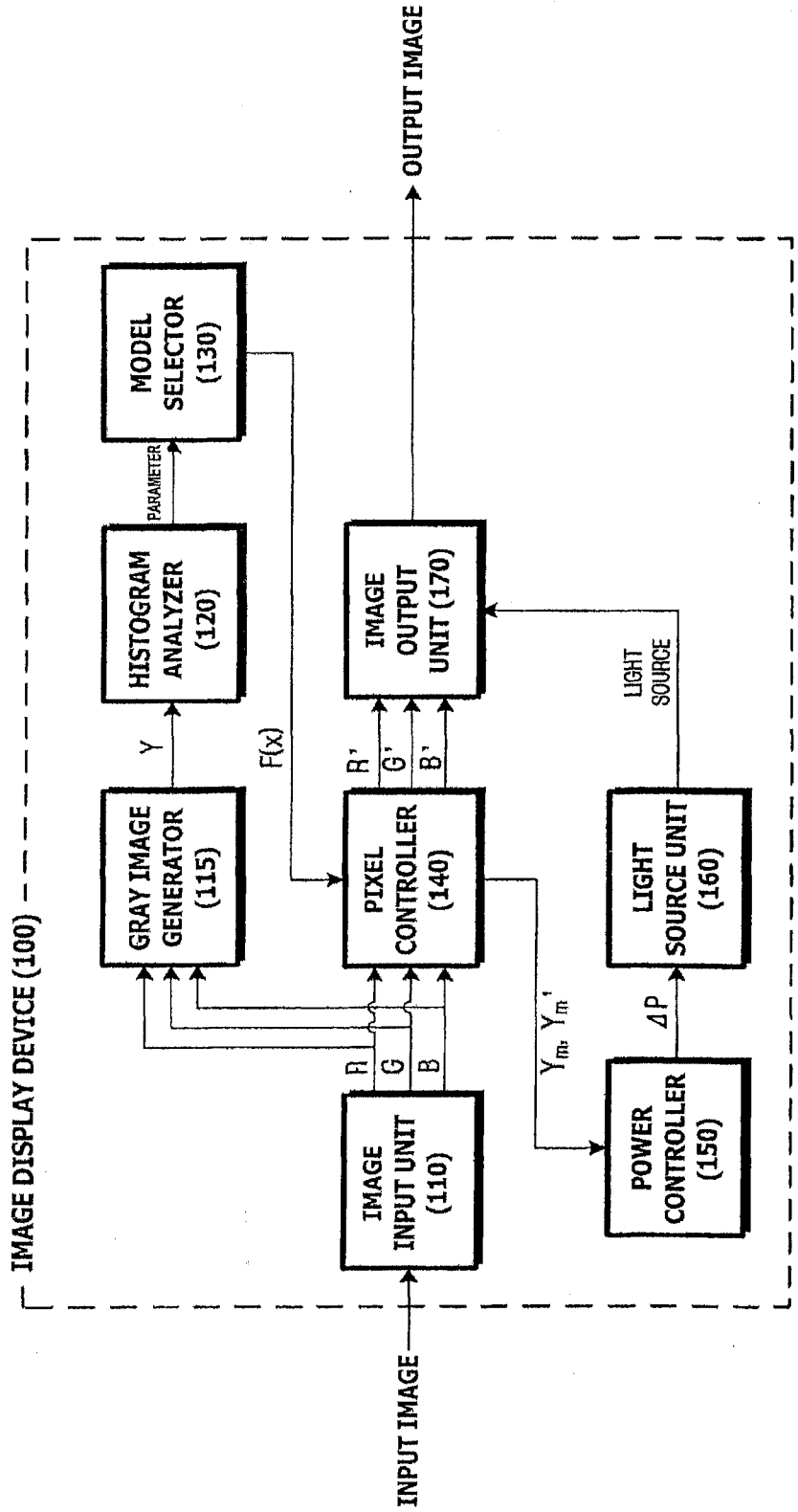
FIG. 1 is a block diagram illustrating the construction of an image display device according to one embodiment of the present invention.

Hereinafter, embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but will be implemented in diverse forms. The matters defined in the description, such as the detailed construction and elements, are nothing but specific details provided to assist those of ordinary skill in the art in a comprehensive understanding of the invention, and the present invention is only defined within the scope of appended claims. In the whole description of the present invention, the same drawing reference numerals are used for the same elements across various figures.

FIG. 1 is a block diagram illustrating the construction of an image display device 100 according to the present invention. The image display device 100 includes an image input unit 110, a histogram analyzer 120, a model selector 130, a pixel controller 140, a power controller 150, a light source unit 160, and an image output unit 170.

The image input unit 110 receives an input image, such as a still image or moving image, from a predetermined image source, and outputs sub-pixels constituting the input image, i.e., R, G, and B components. The input image may be an RGB type signal. Alternatively, the input image may be of another signal format such as YCbCr. If the input image is of a signal format including a gray scale signal Y, the image input unit 110 may include a gray image generator 115.

The gray image generator 115 generates a gray scale image from R, G, and B signals output from the image input unit 110. There may be various methods of generating the gray scale signal Y from each of the R, G, and B signals. The gray scale signal Y may be generated using either a value obtained by multiplying each component by ⅓ or an equation under the NTSC standard, such as Equation (1).

The histogram analyzer 120 prepares histogram from the gray scale signal Y for one image and calculates a parameter representative of the histogram.

Figure 2:
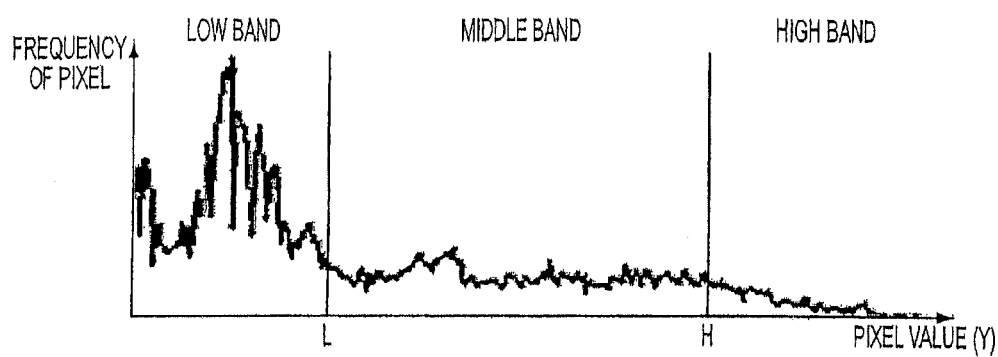
FIG. 2 illustrates an example of an image histogram.

FIG. 2 illustrates an example of the histogram for an image. Referring to FIG. 2, a horizontal axis of the histogram represents a gray scale pixel value (brightness value), for example, a value in the range of 0 to 255 of 8-bit image. And, a vertical axis of the histogram represents frequency generated for each pixel value. The horizontal axis is divided into a low band, a middle band, and a high band. For example, the boundary L between the low band and the middle band means a brightness value corresponding to 30% of a lower rank of the histogram while the boundary H between the middle band and the high band means a pixel value corresponding to 30% of a higher rank of the histogram.

Examples of the parameter representative of the histogram include HighSUM, LowSUM, and Mean. HighSUM means the number of total pixels at the high band while LowSUM means the number of total pixels at the low band. Mean means an average of a pixel value for the total images.

Referring to FIG. 1 again, the histogram analyzer 120 calculates the parameters based on the histogram and provides the calculated result to the model selector 130.

The model selector 130 analyzes the parameters to select a corresponding model of the input image among representative models, and provides a brightness controlling function F(x) corresponding to the selected model to the pixel controller.

Figure 3:
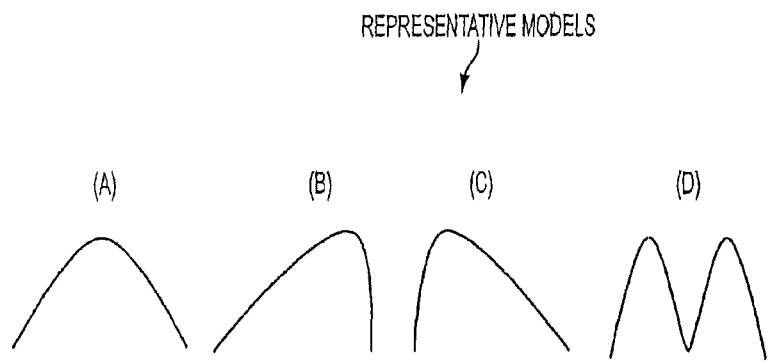
FIG. 3 illustrates an example of an input image divided into four representative models.
Figure 4:
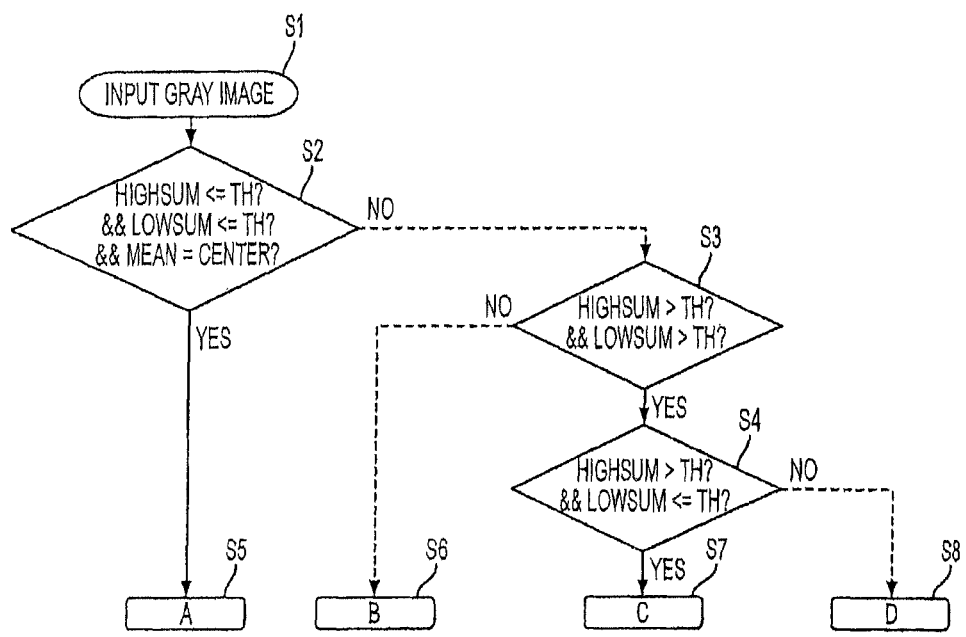
FIG. 4 illustrates a detailed algorithm for determining a model of an input image.

FIG. 3 illustrates an example of the input image divided into four representative models. The models are divided into four based on the histogram of gray image. The number of the models and the type of the models may be subdivided or simplified. An example of an algorithm for determining a model of the input image among the models shown in FIG. 3 is shown in FIG. 4.

First, a gray image is inputted S1.

If the input image belongs to a model A S5, HighSUM belongs to a range within a threshold ratio TH (for example, 25%) for the number of total pixels, and LowSUM belongs to the range within the threshold ratio TH. If Mean is in a middle value range of a brightness range of the total image, the input image belongs to the model A (Yes of S2). The pixel range means the number of gray levels that can be displayed by one pixel. For example, the pixel range may be 256 in the case of an 8-bit image.

Next, if the input image belongs to a model B S6, HighSUM exceeds the threshold ratio TH, and LowSUM belongs to the range within the threshold ratio TH, If Mean is in a pixel range of 0.45 to 0.55, the input image belongs to the model B (No of S3).

If the input image belongs to a model C S7, HighSUM belongs to the range within the threshold ratio TH, and LowSUM exceeds the threshold ratio TH. If Mean is in the pixel range of 0.45 to 0.55, the input image belongs to the model C (Yes of S4).

A model D represents an image having a large number of pixel values corresponding to the high band and the low band. If the input image belongs to the model D S8, HighSUM and LowSUM exceed the threshold ratio TH, and a value obtained by adding HighSUM to LowSUM does not reach 125% (No of S4).

The algorithm for determining the model of the input image has been described according to an embodiment of the present invention, but is not limited thereto. It will be understood that other models of the input image may be selected.

In case where gain of uniform size applies to all pixel values to increase brightness of the input image, it is difficult to expect good quality of the output image. This is because that good image may be obtained by increasing brightness only or by appropriately controlling brightness and contrast to be suitable for image characteristics in view of visual characteristics. Hereinafter, brightness of the image means an average of brightness values of pixels constituting the image.

Figure 5:
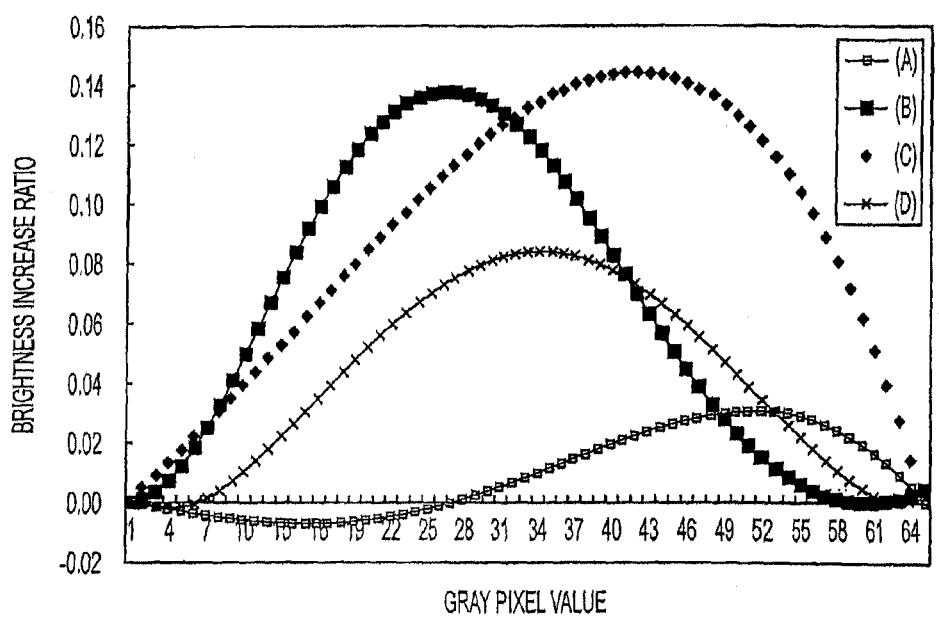
FIG. 5 is a graph illustrating brightness controlling functions selected to be suitable for characteristics of four type images.

FIG. 5 is a graph illustrating brightness controlling functions selected to be suitable for characteristics of four type images. It is noted that four functions have "S"-shaped curve but their detailed formats are different from one another. The brightness controlling functions represent patterns suitable for increasing brightness for each model, and indicate how much each pixel of the input image should be increased. The horizontal axis (independent parameters) of the brightness controlling functions represents pixel values (marked as 0 to 63 in FIG. 5 supposing that a 6-bit pixel value exists) while the vertical axis (dependent parameters) of the brightness controlling functions represents a brightness increase ratio.

To obtain a brightness controlling function for a specific model, experimental operations are required. In other words, after various types of brightness controlling functions expected to be suitable for the specific model are provided, each brightness controlling function is applied to the specific model (brightness of each pixel is increased as much as a value corresponding to the function). Then, the most natural image is selected by a plurality of observers. Thus, the brightness controlling function representative of the selected image is matched with the specific model.

If the above experimental operations are carried out for other models, the brightness controlling functions matching the respective models can be obtained as shown in FIG. 5.

Referring to FIG. 1 again, the model selector 130 provides the brightness controlling function F(x) matched with the selected model for the input image to the pixel controller 140.

The pixel controller 140 selects a representative signal among the RGB signals. The representative signal means a signal having the greatest size (the greatest pixel value) among the RGB signals. Therefore, the representative signal Y can be expressed as Equation (2).

$$Y_{in} = MAX(R, G, B) \quad (2)$$

The representative signal is substituted for F(x) provided from the model selector 130 and then is multiplied by a predetermined gain K to determine a brightness ratio $F(Y_{in})$*K to be increased by the pixel controller 140. The pixel controller 140 adds the representative signal to the determined brightness ratio to calculate an output signal $Y_{out}$ of the representative signal $Y_{in}$ as Equation (3). The gain K can be selected appropriately within the range of 0 to 2.

$$Y_{out} = Y_{in} + F(Y_{in})*K \quad (3)$$

Next, the pixel controller 140 determines an increase ratio C from a $Y_{out}$-to-$Y_{in}$ ratio as Equation (4).

$$C = Y_{out}/Y_{in} \quad (4)$$

The pixel controller 140 controls the respective RGB input signals R, G, B to increase them as much as the increase ratio C determined by Equation (4). In this way, RGB output signals R', G', B' can be expressed as Equation (5).

$$R' = R*C$$

$$G' = G*C$$

$$B' = B*C \quad (5)$$

The signal having the greatest pixel value among the RGB signals is selected as the representative signal $Y_{in}$ so as not to prevent the maximum range among the RGB components from being exceeded due to increase of the pixel value. The same increase ratio C for the respective RGB components is used so as not to generate color distortion.

If an input color space is not an RGB color space, C of Equation (4) can be controlled in its size so as not to generate color distortion in a corresponding input color space. C can be applied to each color signal in the same manner as Equation (5).

Figure 6:
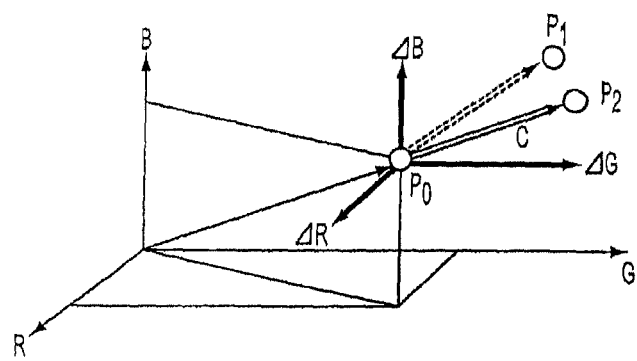
FIG. 6 illustrates an example of brightness enhancement in an RGB space.

Referring to the RGB color space of FIG. 6, if brightness of $P_0$ is increased ($P_1$) in a direction not matched with a vector direction toward $P_0$ from the origin, brightness is enhanced but color distortion occurs between $P_0$ and $P_1$. However, if brightness of $P_0$ is increased ($P_2$) in a direction matched with a vector direction toward $P_0$ from the origin by multiplying each RGB component by the increase ratio C, brightness is enhanced so as not to generate color distortion.

The image output unit 170 generates a physical image from the signals R', G', B' output from the pixel controller 140 and displays the physical image for a user. The image output unit 170 can be implemented by various display means such as LCD, PDP, LED, OLED, and flexible display.

Brightness or contrast of the image can be enhanced to be suitable for characteristics of the input image through the aforementioned operations. Meanwhile, for power control corresponding to another aspect of the present invention, the image display device 100 may further include the power controller 150. The power controller 150 is to reduce power consumption caused by a light source of a device having a limited power supply, such as a cellular phone. If the light source is controlled to be dark in proportional to enhanced brightness, it is possible to reduce power consumption while maintaining the same image in view of the user. The operation for power control will be described below.

The pixel controller 140 outputs the controlled signals R', G', B' and at the same time calculates brightness and contrast values $Y_{mean}$ and $C_{mean}$ of the input image from the RGB signals of the image input unit 110 and calculates brightness and contrast values $Y_{mean}'$ and $C_{mean}'$ of the output image are from the gain-controlled RGB signals to provide $Y_{mean}$, $Y_{mean}'$, $C_{mean}$, and $C_{mean}'$ to the power controller 150. The brightness values mean an average of the gray scale pixel values within one image. The gray scale pixel values can be defined as the value obtained by multiplying each component of R, G, B by ⅓ or the NTSC standard value such as Equation (1). The power controller 150 calculates a power decrease ratio ΔP using the brightness and contrast values $Y_{mean}$ and $C_{mean}$ of the input image and the brightness and contrast values $Y_{mean}'$ and $C_{mean}'$ of the output image. The power controller 150 provides the power decrease ratio ΔP to the light source unit 160. To this end, the power controller 150 needs to identify the correlation (gamma characteristics of the device) between brightness of the image, i.e., the gray scale pixel values and an output luminance value having characteristics dependent upon a display means. Also, the power controller 150 needs to identify the correlation (power characteristics of the device) between the power consumed by the light source unit 160 and the output luminance value.

Since the gamma characteristics of the device and its power characteristics depend upon the device, they can be determined by experiments.

Figure 7:
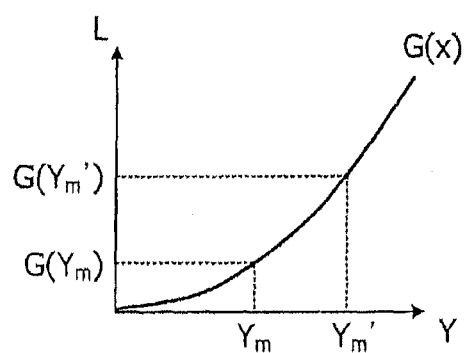
FIG. 7 is a graph illustrating an example of gamma characteristics of the device.
Figure 8:
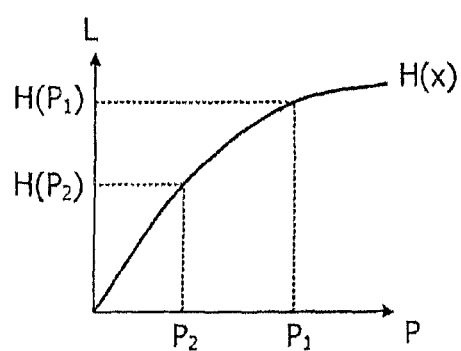
FIG. 8 is a graph illustrating an example of power characteristics of the device.

FIG. 7 is a graph illustrating an example of gamma characteristics of the device, and FIG. 8 is a graph illustrating an example of power characteristics of the device.

Referring to FIG. 7, the horizontal axis means a gray scale pixel value Y, and the vertical axis means a size of luminance L (cd/m$^2$). In the graph illustrating gamma characteristics, the correlation between Y and L is determined by a gamma characteristic function G(x). Generally, a slope of the gamma characteristic function tends to increase as Y increases.

Meanwhile, referring to FIG. 8, the horizontal axis means intensity P (mW) of the power, and the vertical axis means a size of luminance. In the graph illustrating power characteristics, the correlation between P and L is determined by a power characteristic function H(x). Generally, a slope of the power characteristic function tends to decrease as P increases.

The power controller 150 determines $P_2$ to make the difference ($G(Y_{mean}') - G(Y_{mean})$) between a luminance value corresponding to $Y_{mean}'$ and a luminance value corresponding to $Y_{mean}$ in FIG. 7 be equal to the difference ($H(P_1) - H(P_2)$) between a luminance value corresponding to the original power $P_1$ and a luminance value corresponding to the desired power $P_2$ in FIG. 8. Therefore, $P_2$ can be expressed as Equation (6).

$$P_2 = H^{-1}[H(P_1) + G(Y_{mean}) - G(Y_{mean}')] \quad (6)$$

In this case, luminance increased by the pixel controller 140 is offset as the power is decreased by $P_1 - P_2$. Therefore, the user can view an image approximate to its original image. As a result, it is possible to reduce the power corresponding to $P_1 - P_2$.

Alternatively, the power controller 150 determines $P_2$ to make a brightness value ($B(C_{mean}' - C_{mean}, Y_{mean}' - Y_{mean})$) generated by the difference ($Y_{mean}' - Y_{mean}$) between $Y_{mean}'$ and $Y_{mean}$ and the difference $C_{mean}' - C_{mean}$ between $C_{mean}'$ and $C_{mean}$ be equal to a brightness value ($D(P_1 - P_2)$) between a luminance value corresponding to the original power $P_1$ and a luminance value corresponding to the desired power $P_2$. Therefore, $P_2$ can be expressed as Equation (7).

$$P_2 = P_1 - D^{-1}[B(C_{mean}' - C_{mean}, Y_{mean}' - Y_{mean})] \quad (7)$$

In this case, luminance increased by the pixel controller 140 is offset as the power is decreased by $P_1 - P_2$. Therefore, the user can view an image approximate to its original image. As a result, it is possible to reduce the power corresponding to $P_1 - P_2$.

The power controller 150 informs the light source unit 160 of $P_1 - P_2$, i.e., the power decrease ratio ΔP.

Finally, the light source unit 160 decreases the current power $P_1$ by the power decrease ratio ΔP provided from the power controller 150 and supplies the light source corresponding to the decreased power to the image output unit 170.

FIG. 9 illustrates experimental results of the input image whose brightness is increased by the image display device of FIG. 1. The input image 91 is changed to the output image 92 by the pixel controller 140. A histogram for the image 91 is shown at the bottom in FIG. 9.

According to the experiment of FIG. 9, it is noted that the output image 92 has an improved gray scale pixel value by 24% (from 90 to 109) in comparison with the input image while luminance considering gamma characteristics is improved by 83%. Also, it is noted that the power decrease ratio for offsetting the increased luminance reaches 75% of the original power.

In the aforementioned embodiment, the image display device 100 for automatically reducing the power by the increased brightness has been described. Hereinafter, another image display device 200 according to another embodiment of the present invention will be described with reference to FIG. 10. The image display device 200 decreases the power in accordance with the user's command and then compensates brightness of an image darken by the decreased power.

Figure 10:
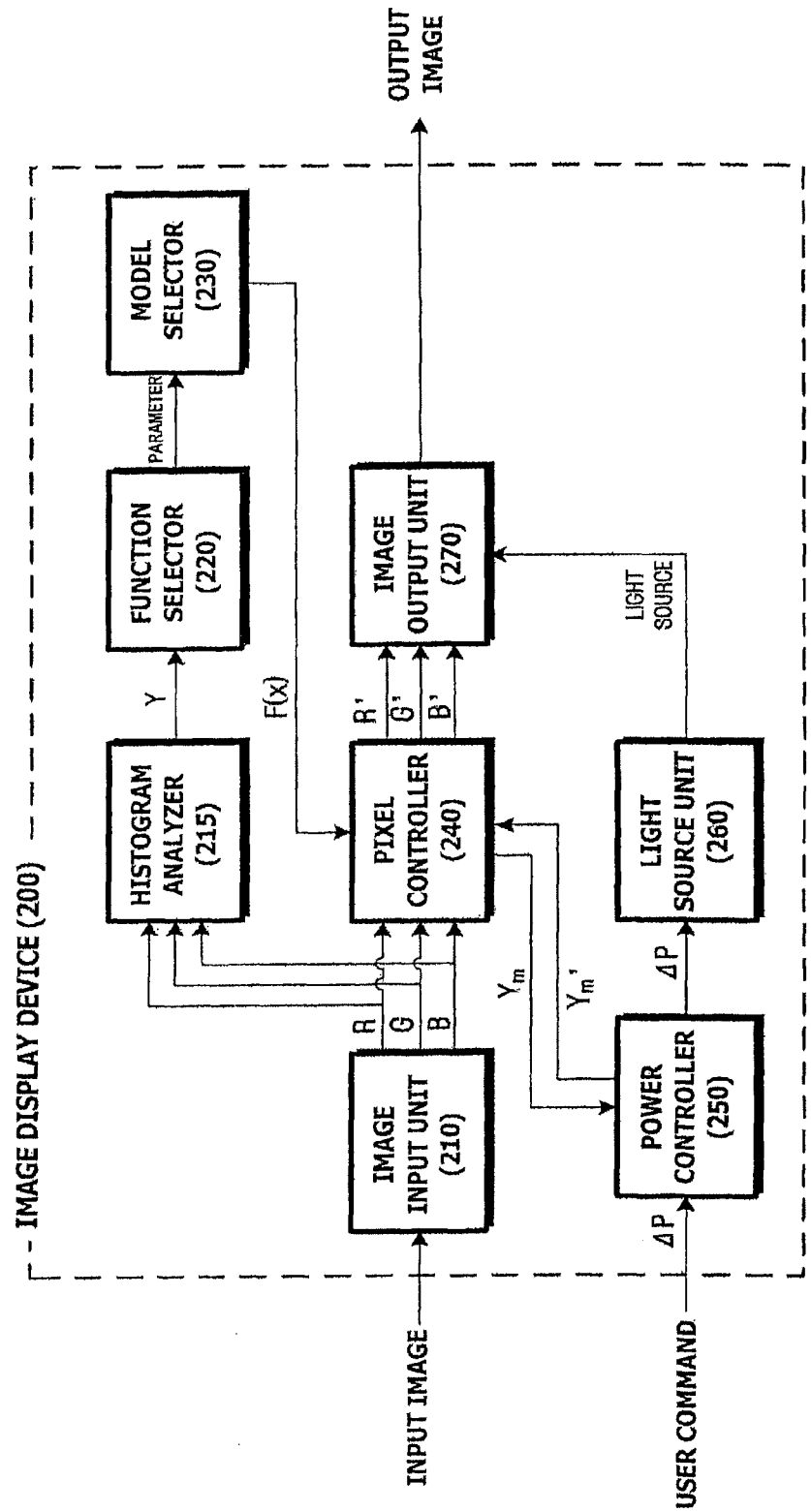
FIG. 10 is a block diagram illustrating an image display device according to another embodiment of the present invention.

In FIG. 10, since an image input unit 210, a histogram analyzer 215, a function selector 220, a model selector 230, a light source unit 260, and an image output unit 270 operate in the same manner as those of FIG. 1, their repeated description will be omitted. The operation of a power controller 250 and a pixel controller 240 will be described.

First, the power controller 250 receives the power decrease ratio ΔP from the user and also receives the average $Y_{mean}$ of the gray scale pixel value for the input image from the pixel controller 240 in the same manner as FIG. 1.

The power controller 250 determines $Y_{mean}'$ to make the difference $(GP(Y_{mean}')-G(Y_{mean}))$ between a luminance value corresponding to $Y_{mean}'$ and a luminance value corresponding to $Y_{mean}$ be equal to the difference $(H(P_1)-H(P_2))$ between a luminance value corresponding to the original power P1 and a luminance value corresponding to the user's desired power $P_2(P_1+\Delta P)$. $Y_{mean}'$ means the average of the gray scale pixel value for the output image. Therefore, $Y_{mean}'$ can be expressed as Equation (8).

$$Y_{mean}'=G^{-1}[H(P_1)-H(P_2)+G(Y_{mean})] \quad (8)$$

The pixel controller 240 can determine a gain value K from $Y_{mean}'$ as follows.

Supposing that the gray scale pixel value of each pixel constituting the input image is $Y_k$, the gray scale pixel value $Y_k'$ of each pixel constituting the output image can be expressed as Equation (9).

$$Y_k'=Y_k F(Y_k)*K \quad (9)$$

A function Avg[ ] representative of an average for the total images is applied to both sides of Equation (9), and Equation (9) is arranged for K to obtain Equation (10). $Avg[F(Y_k)]$ means a value obtained by substituting the gray scale pixel value of each pixel of the input image for the brightness controlling function F(x) and averaging the same.

$$K=(Y_{mean}'-Y_{mean})/Avg[F(Y_k)] \quad (10)$$

After determining the gain K in accordance with Equation (10), the pixel controller 240 controls the input RGB signals in accordance with Equations (3) to (5) to generate the output RGB signals R', B', G' and provides the output RGB signals R', B', G' to the image output unit 270.

The light source unit 260 decreases the current power $P_1$ by the power decrease ratio ΔP provided from the power controller 250 and supplies the light source corresponding to the decreased power to the image output unit 270. The image output unit 270 displays a physical image from the signals R', G', B' using the supplied light source.

The elements described referring to FIGS. 1 and 10 may be implemented by a processor, a digital signal processor (DSP), an application specific integrated circuit (ASIC), a field programmable gate array (FPGA) or other programmable logic device, a discrete gate or transistor logic device, discrete hardware components, or their combination. The processor may be a microprocessor. Alternatively, the processor may be a conventional processor, a controller, a microcontroller, or a state machine. The processor may be implemented by combination of computing devices, for example, combination of the DSP and the microprocessor, a plurality of microprocessors, one or more microprocessors relating to a DSP core, or other elements.

Figure 11:
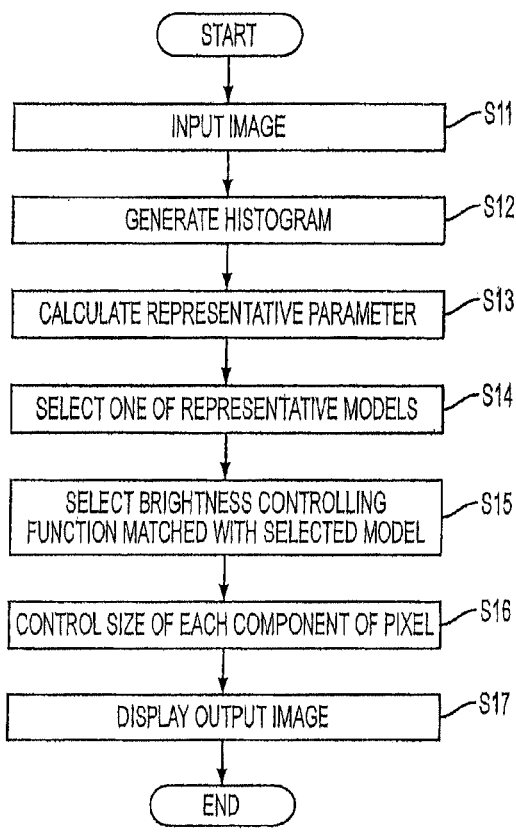
FIG. 11 is a flowchart illustrating a method of increasing brightness of an output image in the embodiment of FIG. 1.

FIG. 11 is a flowchart illustrating a method of increasing brightness of the output image in the embodiment of FIG. 1.

First, the input image is inputted to the image input unit 110 S11.

Next, the histogram analyzer 120 generates histogram from the gray scale pixel value for the input image S12, and calculates a parameter representative of the input image based on the histogram S13. The histogram is displayed by frequency of the gray scale pixel value that is an average of R, G, B components of a pixel constituting the input image.

The model selector 130 analyzes the parameter to select a model corresponding to the input image among a plurality of representative models S14, and selects a brightness controlling function matched with the selected model S15. The parameter includes the number of pixels HighSUM corresponding to the high band, the number of pixels LowSUM corresponding to the low band, the number of pixels MiddleSUM corresponding to the middle band, and an average Mean of the pixel value for the input image. The parameter may further include the number of pixels ZeroBin smaller than a predetermined ratio of frequency average for the pixels corresponding to the middle band, and a dynamic range of the histogram.

Examples of the plurality of models include a model A representative of an image having a large number of pixels corresponding to the middle band and a small number of pixels corresponding to the high and low bands, a model B representative of an image having a large number of pixels corresponding to the high band, a model C representative of an image having a large number of pixels corresponding to the low band, a model E representative of an image having a uniform pixel value distribution, and a model F representative of an image having a large number of discontinuous pixel values.

The pixel controller 140 controls the size of each component of the pixel constituting the input image using the brightness controlling function S16. The brightness controlling function has an "S"-shaped curve, its independent parameter represents a pixel value, and its dependent parameter represents a brightness increase ratio for the pixel value.

The operation S16 includes selecting a component of the greatest size among respective components of the pixel constituting the input image, multiplying the result $F(Y_{in})$, which is obtained by substituting the selected component $Y_{in}$ for the brightness controlling function, by the predetermined gain K and adding the multiplied result to the selected component $Y_{in}$, obtaining a ratio C between the added result $Y_{out}$ and the selected component $Y_{in}$, and increasing the size of each component of the pixel constituting the input image by the ratio C.

Finally, the image output unit 170 displays an output image of a pixel whose size for each component is controlled S17.

Figure 12:
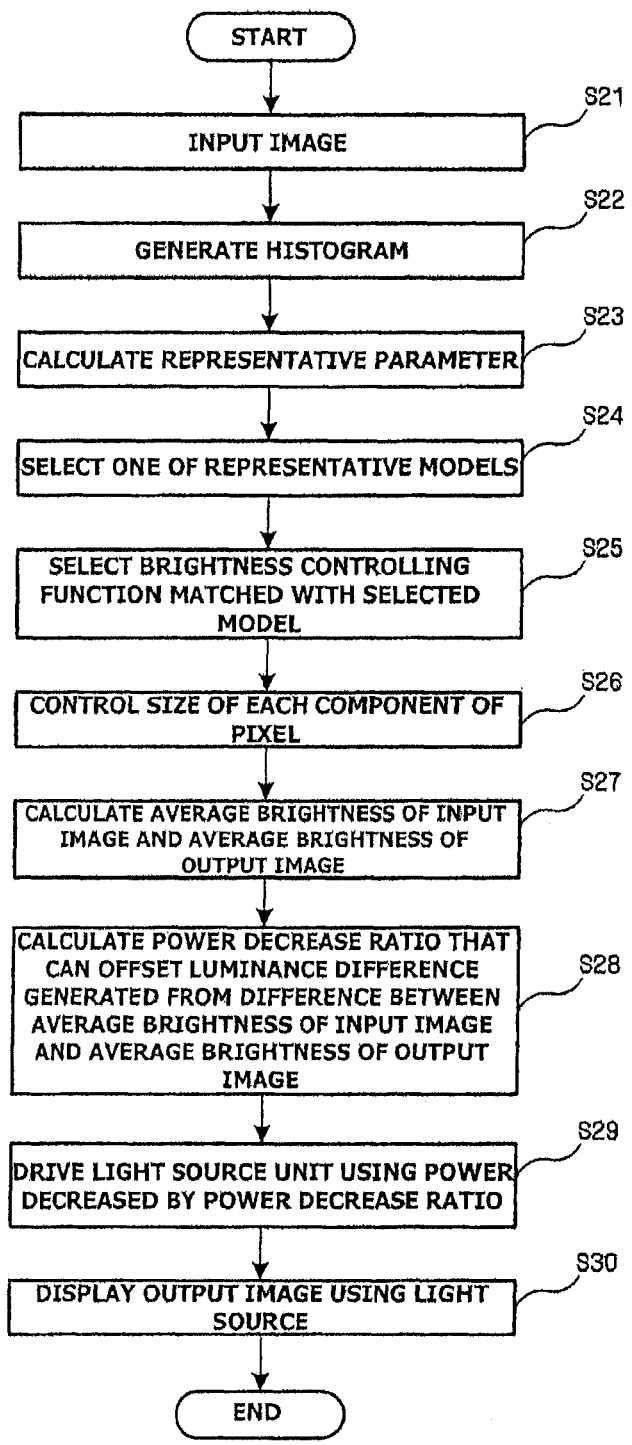
FIG. 12 is a flowchart illustrating a method of reducing the power while maintaining brightness of an output image in the embodiment of FIG. 1.

FIG. 12 is a flowchart illustrating a method of reducing the power while maintaining brightness of the output image in the embodiment of FIG. 1. Since operations S21 to S26 of FIG. 12 are the same as operations S11 to S16 of FIG. 11, their repeated description will be omitted.

The pixel controller 140 calculates brightness $Y_{mean}$ and brightness $Y_{mean}'$ of the output image of the pixel whose size is controlled S27.

The operation S27 includes the operations of calculating the difference $(G(Y_{mean}')-G(Y_{mean}))$ between a luminance value $G(Y_{mean})$ corresponding to brightness of the input image and a luminance value $G(Y_{mean}')$ corresponding to brightness of the output image, and determining the power $H(P_2)$ to make the difference $(G(Y_{mean}')-G(Y_{mean}))$ be equal to the difference between a luminance value $H(P_1)$ corresponding to the original power and a luminance value $H(P_2)$ corresponding to the user's desired power. The correlation between the brightness and the luminance value are determined by the gamma characteristics of the device, and the correlation between the power and the luminance value is determined by the power characteristics of the device.

Next, the power controller 150 calculates the power decrease ratio that can offset the luminance difference generated from the difference between brightness of the input image and brightness of the output image S28.

The light source unit 160 is driven by the power decreased by the power decrease ratio S29, and the image output unit 170 displays the output image based on the light source provided from the light source unit 160 S29.

Figure 13:
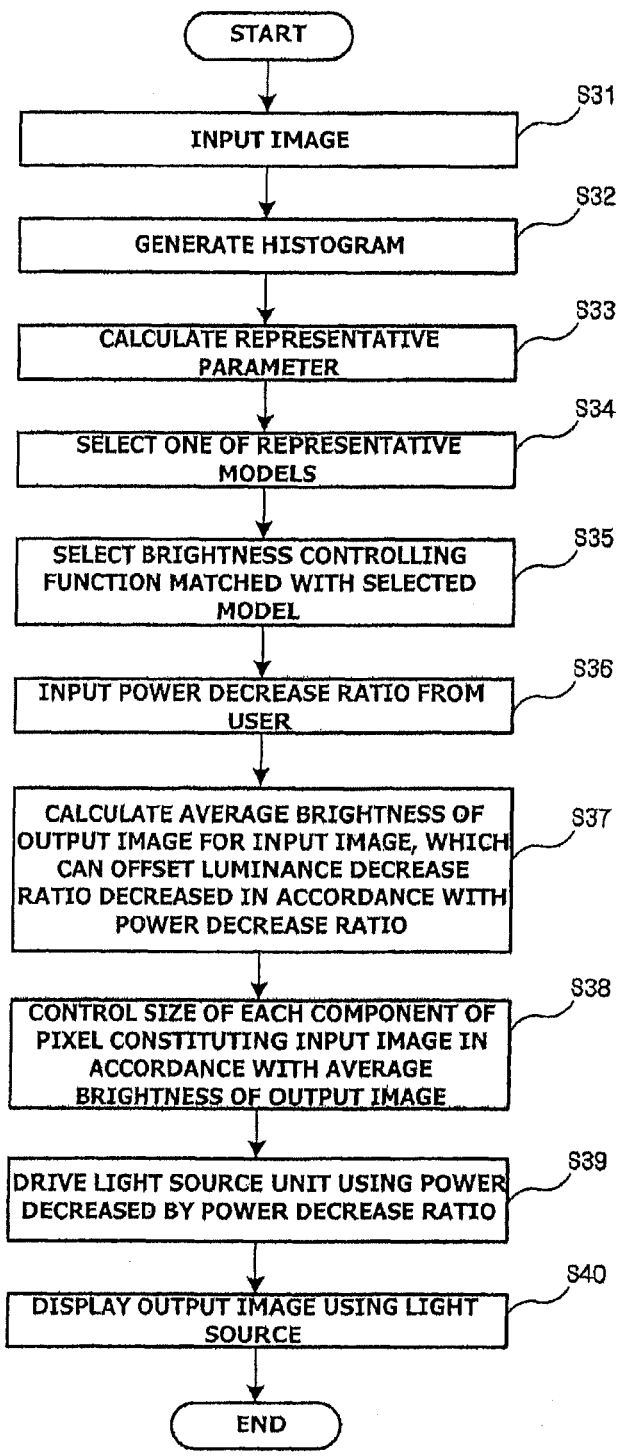
FIG. 13 is a flowchart illustrating a method of increasing brightness of an output image in accordance with a power decrease ratio in the embodiment of FIG. 10.

FIG. 13 is a flowchart illustrating a method of increasing brightness of the output image in accordance with the power decrease ratio obtained in the embodiment of FIG. 10. Since operations S31 to S35 of FIG. 13 are the same as operations S11 to S15 of FIG. 11, their repeated description will be omitted.

The power controller 250 receives the power decrease ratio from the user S36. The power controller 250 calculates brightness of the output image for the input image, which can offset the luminance decrease ratio decreased by the power decrease ratio S37.

The operation S37 includes the operations of obtaining the difference $(H(P_1)-H(P_2))$ between the luminance value $H(P_1)$ corresponding to the original power and the luminance value corresponding to the power $H(P_2)$ decreased from the original power by the power decrease ratio, and calculating brightness $G(Y_{mean}')$ of the output image to make the difference $(H(P_1)-H(P_2))$ be equal to the difference $(G(Y_{mean}')-G(Y_{mean}))$ between the luminance value $G(Y_{mean})$ corresponding to brightness of the input image and the luminance value $G(Y_{mean}')$ corresponding to brightness of the output image.

The pixel controller 240 controls the size of each component of the pixel constituting the input image in accordance with brightness of the output image S38.

The operation S38 includes the operations of determining the gain K from brightness of the output image, and controlling the size of each component of the pixel in accordance with the determined gain.

The operation of determining the gain includes the operations of subtracting brightness $Y_{mean}$ of the input image from brightness $Y_{mean}'$ of the output image, obtaining an average $Avg[F(Y_k)]$ for the input image after substituting brightness $Y_k$ of each pixel constituting the input image for the brightness controlling function, and dividing the subtracted result by the obtained average.

The light source unit 260 is driven by the power decreased by the power decrease ratio S39, and the image output unit 270 displays the output image based on the light source provided from the light source unit 260 S40.

As described above, in the image display device capable of supporting brightness enhancement and power control and the method thereof, it is possible to enhance the brightness and contrast of the image without degradation of the image displayed by the image display device. Also, it is possible to reduce the power consumed by the image display device while uniformly maintaining the brightness and color of the image.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of displaying an image, comprising:
   receiving an input image;
   receiving a power decrease ratio from a user;
   calculating a brightness of an output image corresponding to the input image, which can offset a luminance decrease ratio decreased depending on the power decrease ratio;
   controlling the size of each component of a pixel constituting the input image in accordance with the calculated brightness of the output image; and
   displaying the output image of the pixel whose component size has been controlled, based on a light source driven by a power decreased by the power decrease ratio,
   wherein the calculating the brightness includes:
   obtaining a difference between a luminance value corresponding an initial power and a luminance value corresponding to the power decreased from the initial power by the power decrease ratio; and
   calculating a brightness of the output image to make the difference equal to a difference between a luminance value corresponding to the brightness of the input image and a luminance value corresponding to the brightness of the output image.

2. The method of claim 1, wherein the pixel is composed of red (R), green (G), and blue (B) components.

3. The method of claim 1, wherein the brightness is an average value of gray scale pixel values, which are displayed as averages of each component, through the whole image.

4. The method of claim 1, wherein a correlation between the power and the luminance value is determined by power characteristics of an image display device, and a correlation between the brightness and the luminance value is determined by gamma characteristics of the device.

5. The method of claim 1, wherein the controlling the size of each component includes:
   determining a gain K from the brightness of the output image; and
   controlling the size of each component in accordance with the determined gain.

6. A method of displaying an image, comprising:
   receiving an input image;
   receiving a power decrease ratio from a user;
   calculating a brightness of an output image corresponding to the input image, which can offset a luminance decrease ratio decreased depending on the power decrease ratio;
   controlling the size of each component of a pixel constituting the input image in accordance with the brightness of the output image; and
   displaying the output image of the pixel whose component size has been controlled, based on a light source driven by a power decreased by the power decrease ratio,
   wherein the controlling the size of each component includes:
   determining a gain K from the brightness of the output image; and
   controlling the size of each component in accordance with the determined gain,
   wherein the determining the gain includes:
   subtracting the brightness of the input image from the brightness of the output image;
   obtaining an average for the input image after substituting a brightness of each pixel constituting the input image for a brightness controlling function; and
   dividing the subtracted result by the obtained average.

7. An image display device comprising:
   an image input device to receive an input image;
   a power controller device to receive a power decrease ratio from a user and calculate a brightness of an output image corresponding to the input image, which can offset a luminance decrease ratio decreased depending on the power decrease ratio;

a pixel controller device to control the size of each component of a pixel constituting the input image in accordance with the calculated brightness of the output image;

a light source device driven by a power decreased by the power decrease ratio; and an image output device to display the output image of the pixel whose component size has been controlled, based on a light source from the light source unit, wherein the power controller device obtains a difference between a luminance value corresponding to an initial power and a luminance value corresponding to the power decreased from the initial power by the power decrease ratio, and calculates the brightness of the output image to make the difference equal to a difference between a luminance value corresponding to the brightness of the input image and a luminance value corresponding to the brightness of the output image.

8. An image display device comprising:

an image input unit to receive an input image;

a power controller to receive a power decrease ratio from a user and calculate a brightness of an output image corresponding to the input image, which can offset a luminance decrease ratio decreased depending on the power decrease ratio;

a pixel controller to control the size of each component of a pixel constituting the input image in accordance with the calculated brightness of the output image;

a light source unit driven by a power decreased by the power decrease ratio; and an image output unit to display the output image of the pixel whose component size has been controlled, based on a light source from the light source unit, wherein the pixel controller determines a gain K from the brightness of the output image, and controls the size of each component in accordance with the determined gain, and wherein the pixel controller determines the gain by subtracting the brightness of the input image from the brightness of the output image, obtaining an average for the input image after substituting a brightness of each pixel constituting the input image for a brightness controlling function, and dividing the subtracted result by the obtained average.

* * * * *